United States Patent
Bach (10) Patent No.: US 6,402,395 B1
(45) Date of Patent: Jun. 11, 2002

(54) OPTICAL WAVEGUIDE PLUG CONNECTOR FOR A MECHANICALLY RELEASABLE CONNECTION BETWEEN AN OWG CONNECTOR AND A PRINTED CIRCUIT BOARD

(75) Inventor: Friedrich Bach, Nuremberg (DE)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/410,729

(22) Filed: Oct. 1, 1999

(30) Foreign Application Priority Data

Oct. 5, 1998 (DE) .......................................... 198 45 854

(51) Int. Cl.⁷ ................................................ G02B 6/42
(52) U.S. Cl. .......................................... 385/92; 385/89
(58) Field of Search ................................ 85/53, 88–94

(56) References Cited

U.S. PATENT DOCUMENTS

| | | | | |
|---|---|---|---|---|
| 4,186,995 A | * | 2/1980 | Schumacher | |
| 4,273,413 A | * | 6/1981 | Bendiksen et al. | |
| 4,377,322 A | * | 3/1983 | Ransley et al. | |
| 4,461,537 A | * | 7/1984 | Raymer et al. | |
| 4,778,240 A | * | 10/1988 | Komatsu | |
| 4,915,470 A | * | 4/1990 | Moore et al. | |
| 5,127,073 A | * | 6/1992 | Mulholland et al. | 385/92 |
| 5,475,783 A | * | 12/1995 | Kurashima | 385/92 |
| 6,059,463 A | * | 5/2000 | Althaus et al. | 385/92 |

FOREIGN PATENT DOCUMENTS

| | | |
|---|---|---|
| DE | 44 12 571 C1 | 6/1995 |
| DE | 195 25 739 C1 | 10/1996 |

* cited by examiner

Primary Examiner—Rodney Bovernick
Assistant Examiner—Michael J. Stahl
(74) Attorney, Agent, or Firm—Perman & Green, LLP (57) ABSTRACT

A specification is given of an OWG plug connector (101) for a mechanically releasable connection between at least one OWG connector and a printed circuit board, having a housing (103) having at least one chamber (104) for accommodating the OWG connector (105) and at least one cavity (112) for accommodating an active element (113), the cavity and the chamber being connected via a hole (106); a printed circuit board (102) having continuous openings (107a, 107b) for latching feet (108) of the housing and for connecting pins (109); at least one OWG connector, the end piece (111) of the OWG connector being bounded by an exit face (110); and at least one active element, in which case at least three elastic shoulders (115) are integrally formed on the inner walls of the cavity in such a way that the active region of the active element is oriented centrally with respect to the longitudinal axis of the hole and is arranged underneath the hole.

28 Claims, 7 Drawing Sheets

OPTICAL WAVEGUIDE PLUG CONNECTOR FOR A MECHANICALLY RELEASABLE CONNECTION BETWEEN AN OWG CONNECTOR AND A PRINTED CIRCUIT BOARD

The present invention relates to an OWG plug connector for a mechanically releasable connection between at least one OWG connector and a printed circuit board.

Such plug-in systems can be used wherever there are optical signal transmissions. Thus, the transmission of information is effected via OWGs on account of the constantly increasing requirements made of the transmission rate (25 to 50 Mbit/s), for example in modern automobiles.

The printed documents DE 44 12 571 and DE 195 25 739 have disclosed OWG plug connectors which butt directly against an active element, for example a transceiver. This means that the active element is situated in the mating connector. For structural reasons, the OWG connector projects from the OWG plug connector. The OWG plug connector together with active element are usually fitted on the housing exterior of a multimedia device, such as e.g. a CD player, in order to minimize the attenuation between OWG connector and active element.

In this case, it is particularly disadvantageous that the interface between OWG and active element is arranged without any protection outside the device and is particularly susceptible to electromagnetic interference. This solution is unsuitable for the transmission rates required, since the EMC (electromagnetic compatibility) decreases as the transmission rate increases. Furthermore, it is disadvantageous that the OWG presses directly onto the active element, since, in the event of external mechanical influences, such as e.g. vibration, the optical surface may be damaged and attenuation is thus produced at the OWG conductor/active element junction.

Moreover, plug connectors have been disclosed in which the OWG connector butts against the active element and the two are subsequently potted jointly with epoxy resin.

In this case, it is particularly disadvantageous that, on the one hand, the connection between OWG connector and active element is no longer releasable and, on the other hand, as a result of material fatigue, the resin becomes dull, the fibre acquires hairline cracks or the connection tears completely, with the result that the attenuation becomes ever greater over time in the first and second cases and transmission is no longer possible in the third case.

The object of the invention is to specify a plug connector for a mechanically releasable connection between at least one OWG connector and a printed circuit board which, to the largest extent possible, is insensitive to EM interference without it causing appreciable attenuation in the process.

This object is achieved by means of the features specified in the claims.

The second optical waveguide plug connector is equipped, for a mechanically releasable connection between at least one OWG connector and a printed circuit board, with a housing comprising at least one chamber for accommodating an OWG connector and at least one cavity for accommodating an active element, the cavity and the chamber being connected via a hole, and also with a printed circuit board having continuous openings for latching feet of the housing, on the one hand, and for connecting pins, on the other hand, with at least one OWG connector, the end piece of which is bounded by an exit face, and with at least one active element, in which case at least three elastic shoulders are integrally formed on the inner walls of the cavity in such a way that the active region of the active element arranged in the cavity is oriented centrally with respect to the longitudinal axis of the hole and is arranged underneath the hole. Furthermore, when the OWG connector is situated in the chamber, then the end piece projects into the cavity, with the result that a minimum defined spacing is produced between the exit face and the active region. In addition, the latching feet pass through the openings in order to fasten the housing to the printed circuit board.

In the case of plug connectors having a plurality of OWG cables, the OWG connectors may have lugs operating as codings which guarantee the capability of fitting the respective chambers.

It is preferable for the second OWG connector to be embodied as a "pigtail" for an active element. A "pigtail" is to be understood to mean an optical extension cable for an active element; in this case, the one end can be connected directly to the active element and the other element is preformed with a second OWG connector. This affords the possibility of banishing the active element from the mating connector and arranging it at a suitable location in terms of EMC. The plug connector is now independent of the development of the active element, with the result that the plug connector may survive a number of active element generations, since every new development of the active element may entail a development of a new mechanical interface between active element and OWG.

Further features and advantages of the invention emerge from the following description of an OWG plug connector as an example of a preferred configuration of the invention with reference to the schematic drawings, in which.

The structure of the first plug connector 1 is described in detail below.

Figure 1:
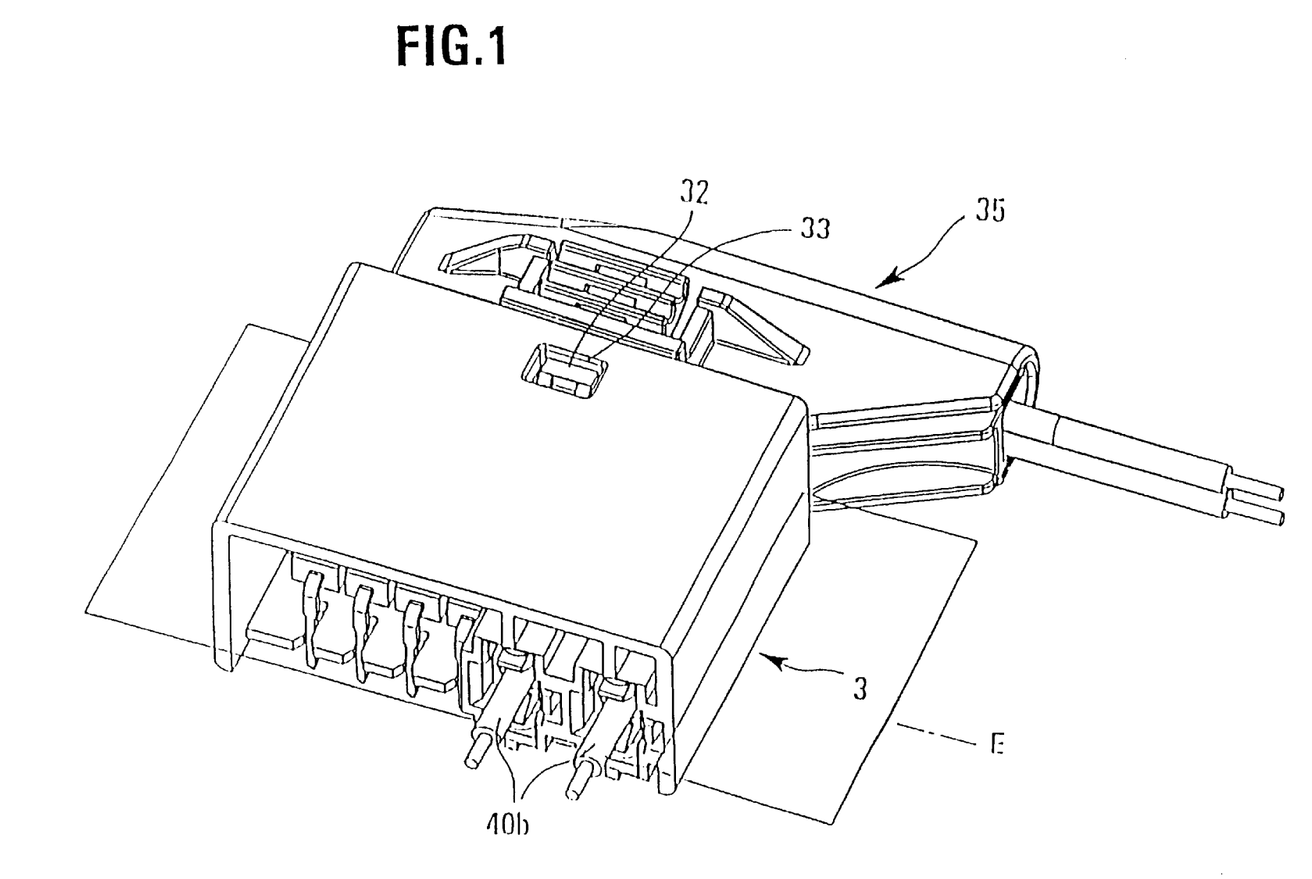
FIG. 1 shows an oblique plan view of a first plug connector in the plugged-in state.
Figure 3:
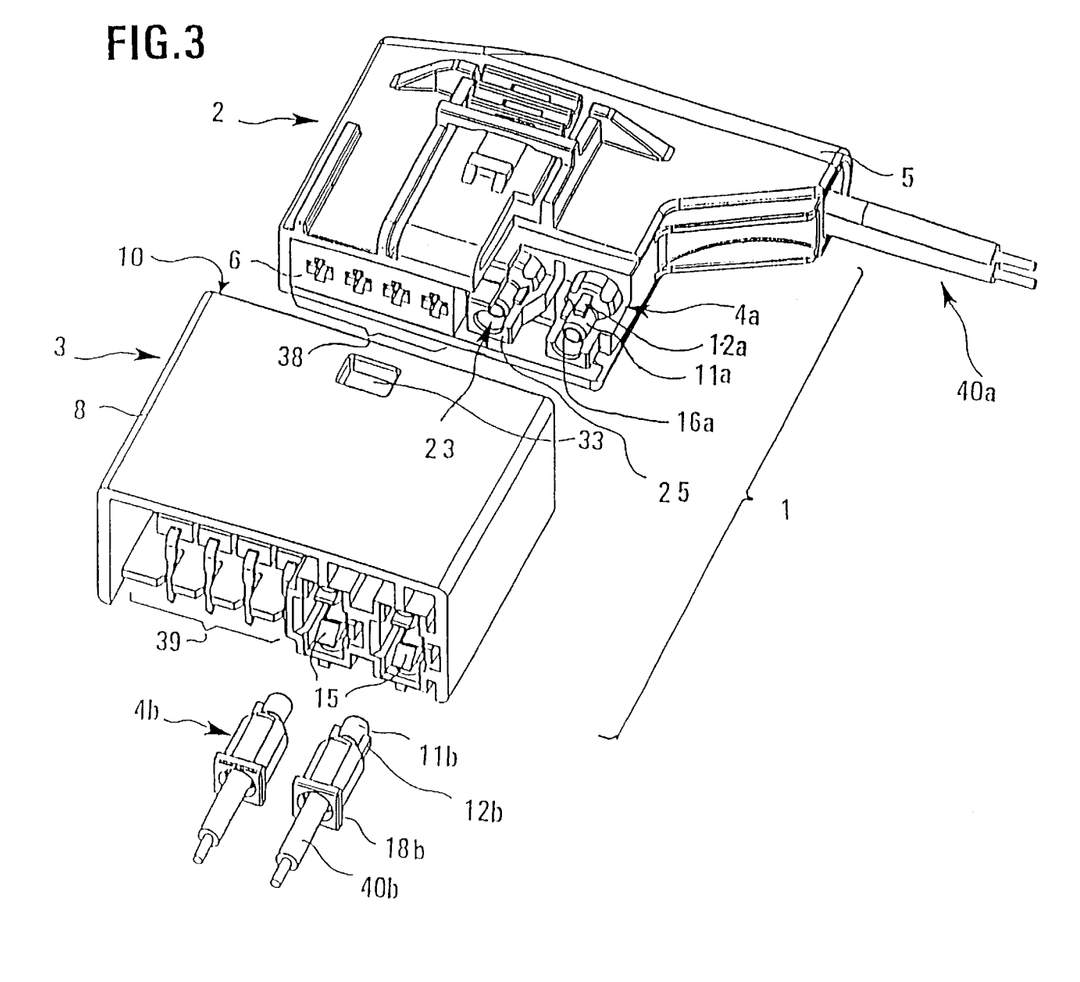
FIG. 3 shows an oblique plan view of a first plug connector which is in the non-plugged-in state.

The first plug connector 1 can be seen in an oblique plan view in the unplugged-in state in FIG. 3 and in the plugged-in state in FIG. 1. The first plug connector 1 is composed of at least four components, a connector 2, a mating connector 3 and at least two OWG connectors 4a, 4b. The connector 2 is partly cut away in FIG. 3 in order to illustrate its inner structure. The latter essentially has a first housing 6 with an electrical plug-in unit 38 and two first chambers 7, which are preformed with OWG connectors and are readily visible in the cut-out region in FIG. 3, as well as OWG cables 40a associated with the OWG connectors 4a, and a covering cap 5 pushed onto the housing 6.

The mating connector 3 essentially has a second housing 8, one end being provided with an insertion shaft 10, which is necessary for the connector 2. The opposite end of the second housing 8 on the one hand has two second chambers 9 and on the other hand may have an electrical mating plug-in unit 39 matching the electrical plug-in unit 38 and having correspondingly required electrically conductive connections. In FIG. 3, the electrical plug-in unit 38 is provided with four electrical connections. Both the electrical plug-in unit 38 and the electrical mating plug-in unit 39 are not part of the subject-matter of the invention.

The OWG connectors 4a, 4b can be roughly divided into four regions, a cylindrical end piece 11a, 11b, a centre piece (not described in any specific detail), an adjoining collar 18a, 18b with a square cross section, and the OWG cables 40a, 40b. The end piece 11 is bounded by the exit face 16, which is hot-plated, that is to say that this face is absolutely planar, with the result that hardly any attenuation is produced when the "light" exits or enters. As will subsequently become clear, the mating connector 3 must be preformed with the OWG connectors 4b before the connector 2 is guided into the insertion shaft 10 until a latching lug 32 of the connector 2 snaps into a matching latching opening 33 of the mating connector 3, in order to lock the connector and the mating connector together.

It should be noted that all parts of the first OWG connector are provided with the reference symbol "a". Correspondingly, the parts of the second OWG connector are identified by "b". The two OWG connectors 4a, 4b differ only in terms of the coding lugs 12. The latter guarantee the capability of the OWG connectors to fit in the respective chambers.

Figure 4:
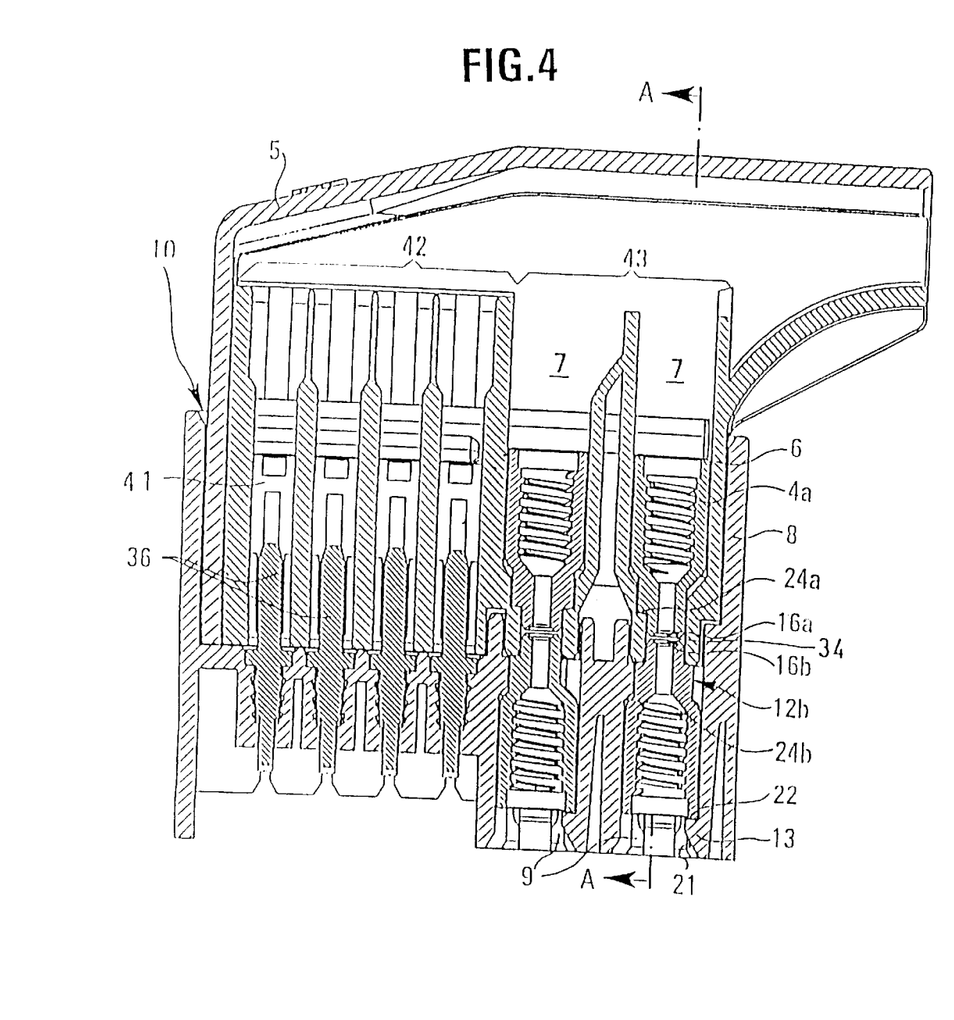
FIG. 4 shows a section along the plane E along the first plug connector from FIG. 1.
Figure 5:
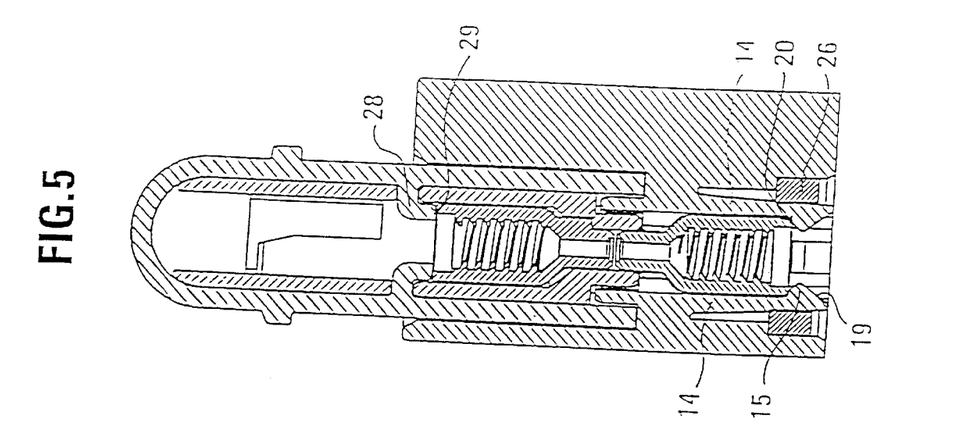
FIG. 5 shows a section along the line A—A of the plug connector from FIG. 4.

FIG. 4 shows a section along the plane E of the plug connector from FIG. 1, FIG. 5 showing a section along the line A—A— of the plug connector from FIG. 4. The electrical plug-in unit 42 is readily discernible in the left-hand region of the plug connector. Four chambers, which can each accommodate a female connector (not illustrated), are discernible in the upper region of this unit. In the lower region of the unit, the four female mating connectors 36 are fixedly anchored together with the second housing 8, the contact prongs of the female mating connectors 36 projecting into the chambers 41 provided in the first housing 6. The right-hand portion of the plug connector shows the OWG unit 43. Two first square chambers 7 are discernible in the upper region of this unit, an OWG connector 4a being situated without play in each of the said chambers. In order to provide a better understanding, the OWG cable 40a has not been illustrated as well. The OWG connector 4a on the one hand rests with its lug 12a on the stop 24a and, on the other hand, this connector is secured by the guide rail 28 in the vertical direction, the end face 29 of the guide rail 28 resting on the collar 18a (see FIG. 4). The side areas of the collar 18a and of the center part are guided by the side walls of the chamber 7. Furthermore, the exit face 16a of the cylindrical end piece 11a projects into the hole 23, the wall 25 of the hole 23 centering this end piece.

Two chambers 9 with a square cross section, which are provided in the housing 8 of the mating connector 3, can likewise be seen in the lower region of the OWG unit. One wall of the chamber is designed as an elastic securing arm 13, the latter having a latching lug whose end 21 is inwardly bevelled, and the rear side 22 of the latching lug running transversely with respect to the plugging direction, with the result that the OWG connector 4b is captively secured in the chamber 9. Two further walls of the chamber 9 are designed as elastic latching arms 14, whose free ends have latching lugs 15 on the side facing the chamber, which latching lugs have, as seen in the plugging direction, a bevelled end 19 and a bevelled rear side 20 in each case (see FIG. 4). In order to strengthen the elastic spring force of the latching arms 14, elastic elements 26 are arranged between the second housing 8 and the free ends of the latching arms. The fourth wall of the chamber 9 is designed as a rigid guide wall.

As already mentioned, the connector 2 is not situated in the insertion shaft 10 during the preforming of the mating connector 3 with OWG connectors 4b. When the OWG connector 4b is pushed into the chamber 9, the latching arms 14 and the securing arm 13 are spread apart until the collar 18b has surmounted the ridge of the latching lugs 15, with the result that the latching arms 14 can snap back and the rear side 22 of the securing arm 13 is situated parallel to the collar area. When the latching arms 14 snap back, the bevelled rear side 20 presses against the collar 18b, with the result that a force acts upwards and holds the OWG connector 4b, against the stop 24b. During this operation, the collar area 18b is removed from the rear side 22 of the securing arm 13.

When the connector 2 is inserted into the mating connector 3, the end piece 11b dips into the hole 23 in the connector 2 until the wall 25 of the hole reaches the lug 12b, a defined gap thereby being produced between the exit faces 16a, 16b. As the connector 2 is inserted further, the OWG connector 4b is pressed downwards by the wall 25 counter to the spring forces of the latching arms 14, until the connector 2 latches into place in its final position. It should be noted that the gap 34 is independent of the tolerances of the locking mechanisms, such as e.g. securing arm 13, latching arms 14, etc. The gap is defined only by the spacings between the edge of the lug 12a, 12b and the exit faces 16a, 16b and by the diameter of the hole 23. These dimensions are very small in terms of production engineering, so that the gap hardly varies due to production. As a result, the gap can be chosen to be as small as possible in order to avoid unnecessary attenuation. In addition, the hole 23 ensures that the exit faces are arranged parallel to one another. In interaction with the longitudinal play of the lower OWG connector 4b and the bevelled rear sides 20 of the latching lugs 15, a pressure is produced between the wall 25 of the hole 23 and the lug 12b, a firm fit thereby being ensured for the lower OWG connector 4b.

Figure 6:
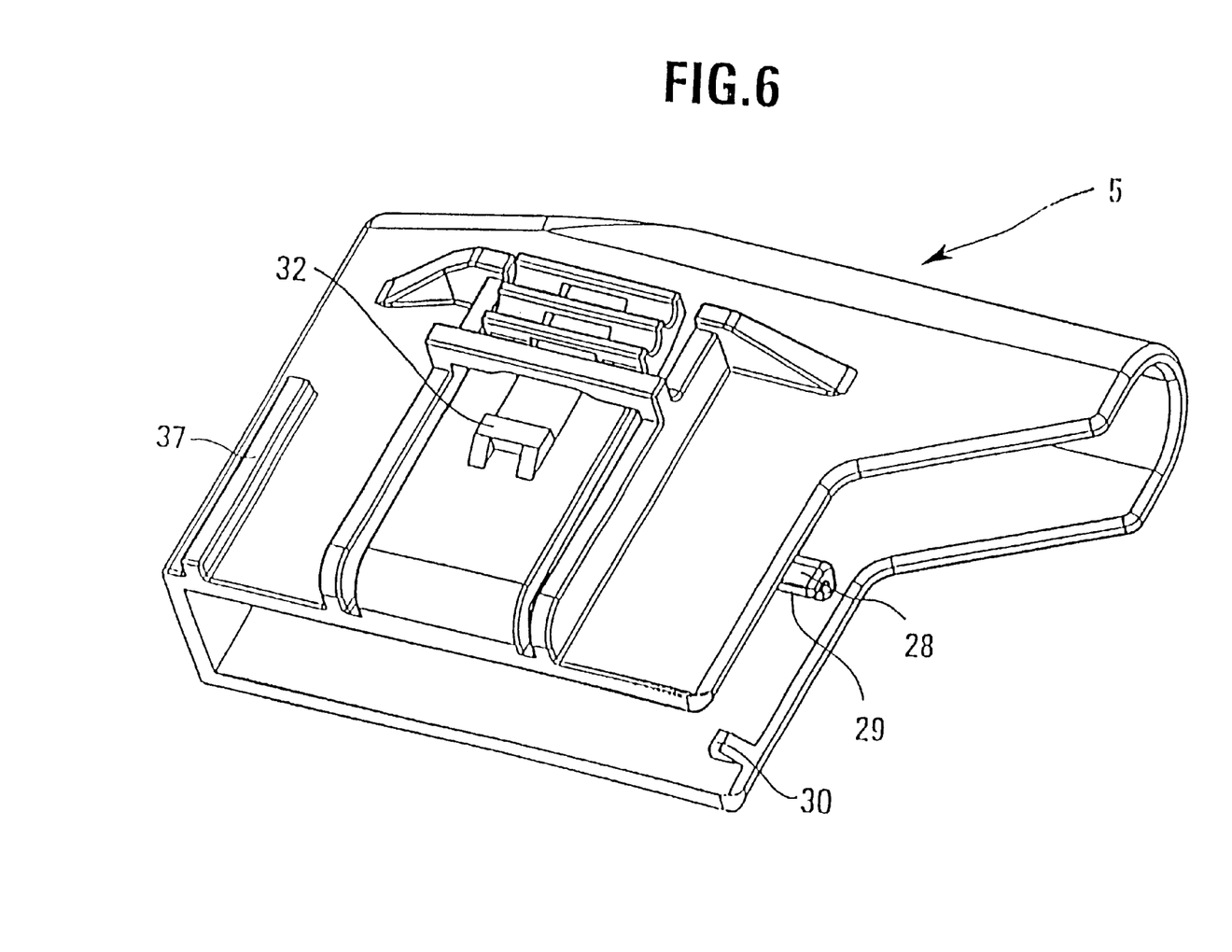
FIG. 6 shows an oblique plan view of the covering cap of the connector.

A covering cap 5 with an annular cable outlet can be seen in an oblique plan view in FIG. 6, the said cable outlet having a shoulder 37 and a latching lug 32 on the outer area along the plug-in device. Inside the covering cap, an L-shaped guide rail 28 is integrally formed transversely with respect to the plugging direction, and so, too is a latching element 30 which is wedge-shaped transversely with respect to the plugging direction.

Figure 7:
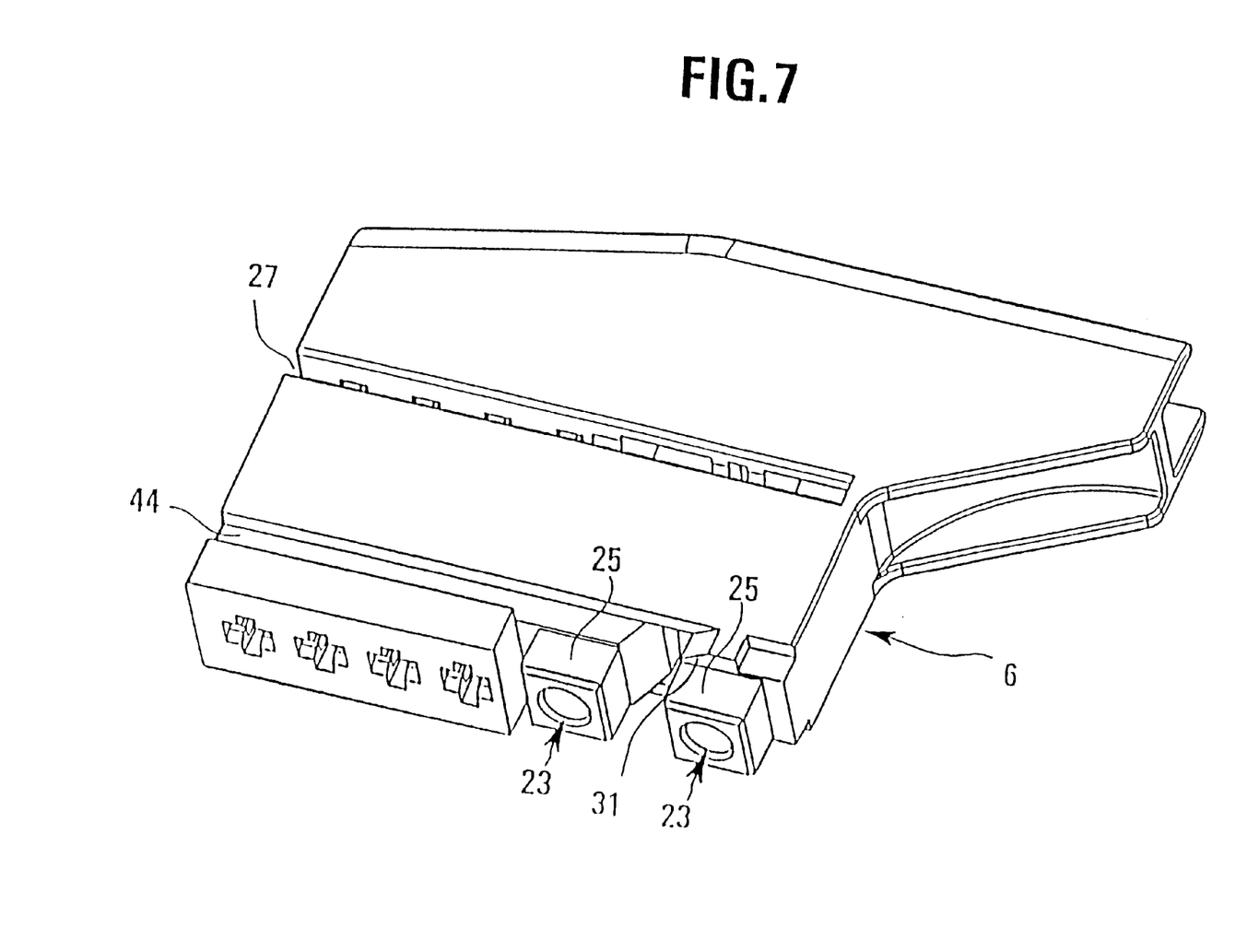
FIG. 7 shows an oblique plan view of the connector housing.

FIG. 7 shows a first housing of the connector 2 in an oblique plan view. On the connector side it is possible to see, on the one hand, the openings of the chambers of the female mating connectors and, on the other hand, the square walls 25 of the hole 23. Behind these elements there is a guide groove 44 on the top side of the housing, which guide groove runs transversely with respect to the plug-in direction and has a wedge-shaped latching element 31. A longitudinal opening 27 which likewise runs transversely with respect to the plugging direction has been made in the top side of the housing.

During the assembly of the connector 2, firstly the chambers 7 have to be occupied by the corresponding OWG connectors 4a together with cables 40a. Only then can the covering sleeve 5 be pushed onto the housing 6, the L-shaped guide rail 28 passing into the longitudinal opening 27, with the result that the end of the L slides along the collar 18a until the latching elements 30 and 31 lock the system.

Figure 2:
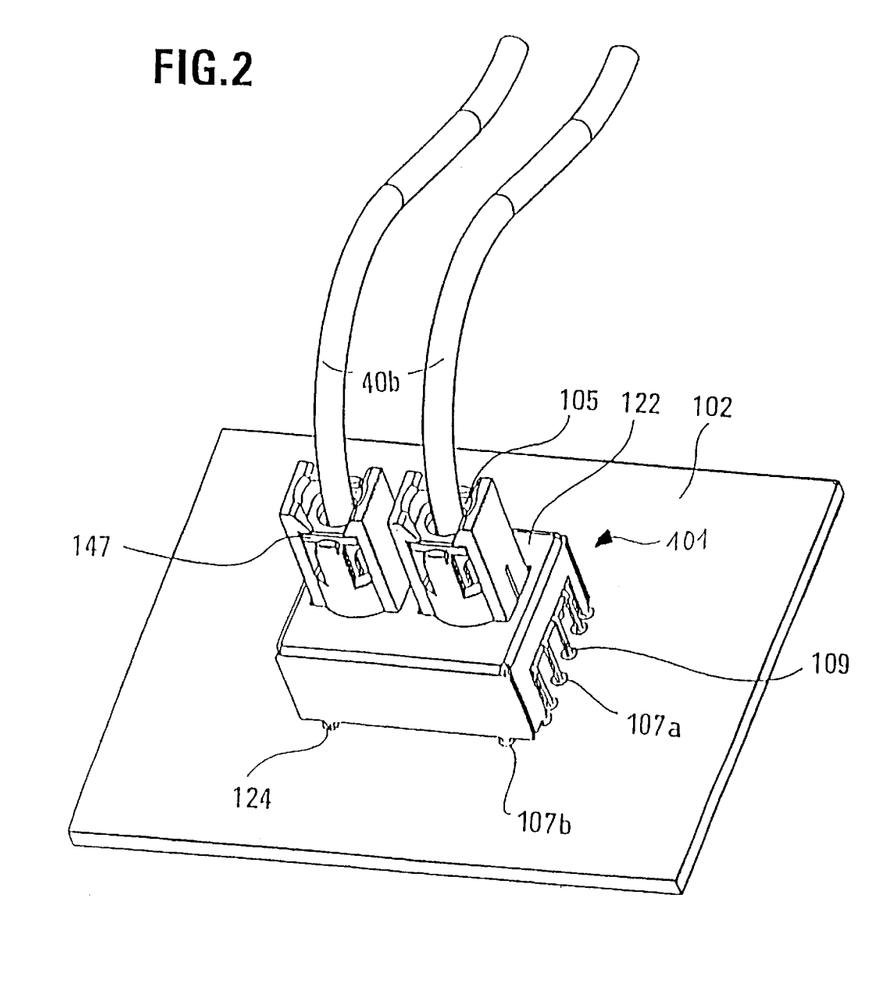
FIG. 2 shows an oblique plan view of a printed circuit board with a second plug connector according to the invention.

FIG. 2 shows a printed circuit board equipped with an OWG plug connector 101, into which two OWG connectors 105 are plugged. The base region 121 of the plug connector 101 is provided with a screen 122 having connecting pins 124 in order to be electrically connected to the printed circuit board 102. The fact that the screen has a cutout for the connecting pins 109 of the active element on one side area is readily discernible in FIG. 2.

Figure 8:
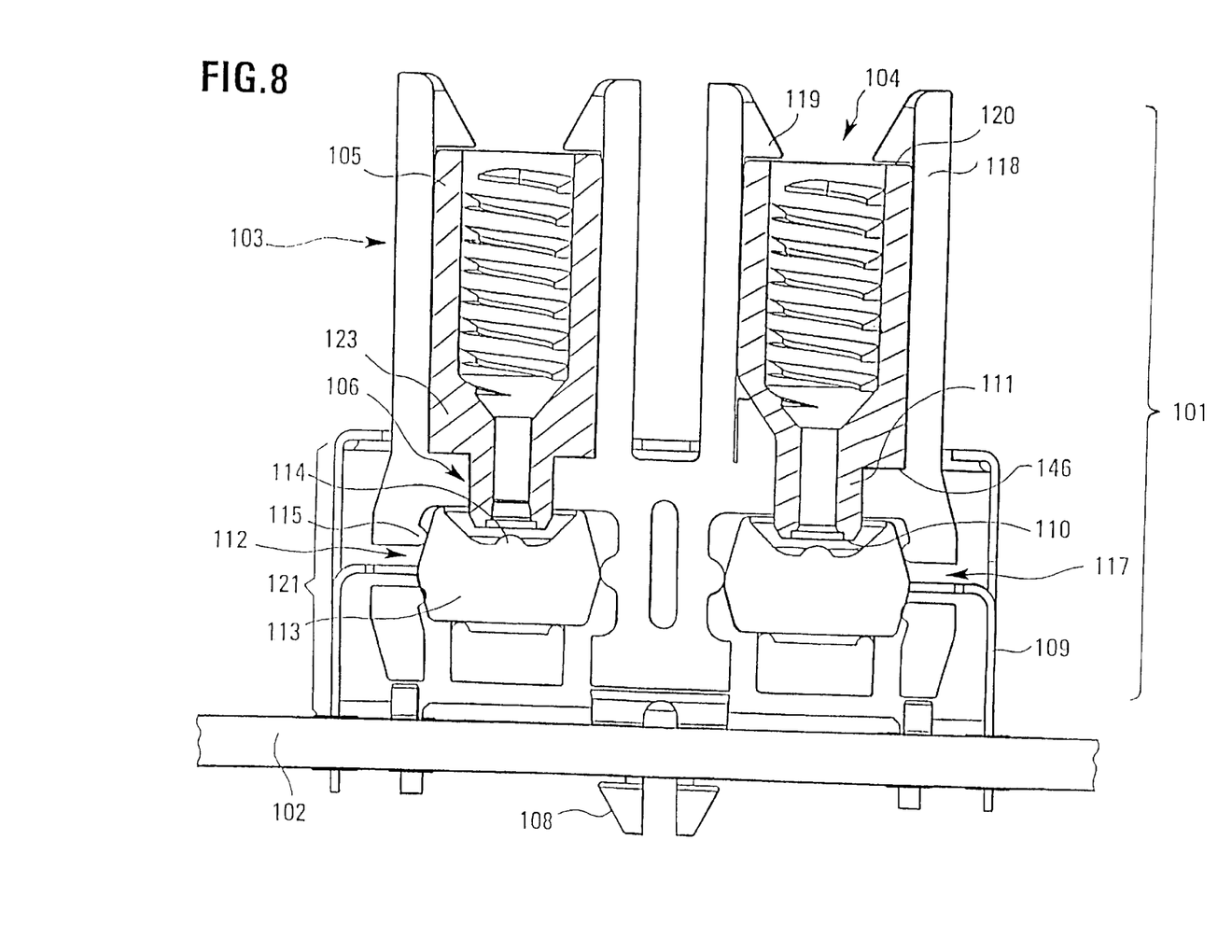
FIG. 8 shows a vertical section through the second plug connector from FIG. 2.

FIG. 8 shows a vertical section through the plug connector 101. The plug connector comprises three parts. Two chambers 104 for accommodating OWG connectors 105 are discernible in the upper region. The walls of the chamber are embodied as elongate latching arms on whose free ends latching lugs are integrally formed, whose ends are bevelled towards the chamber and the rear side runs transversely with respect to the plug-in direction.

Two cavities 112 are discernible in the lower region of the plug connector, the so-called base region 121, elastic centering shoulders 115 being integrally formed on the inner walls of the cavity 112. The said shoulders center an active element 113 situated in the cavity 112 in such a way that the active region of the active element 113 is situated in the axis of symmetry of the chamber 104. The active element 113 is provided with a lens 114 arranged on an active region of the active element. The chambers and the cavities 112 are connected to one another via holes 106.

The OWG connectors 105 can be roughly divided into four regions, a cylindrical end piece 111, a center piece (not described in any specific detail), an adjoining collar 147 with a square cross section, and the OWG cables 40b. The end piece is bounded by the exit face 110, which is hot-plated, that is to say that this face is absolutely planar, with the result that hardly any attenuation is produced when the "light" exits or enters.

When an OWG connector 105 is plugged into the chamber 104, the elongate latching arms 118 spread apart until the lug 123 of the OWG connector 105 butts against the stop 146, the latching arms thereby attaining the locking position, the rear side 120 of the latching lug reaching the collar 147 of the OWG connector 105. As the OWG connector 105 is inserted, the end piece 111 penetrates the hole, the end piece 111 projecting into the cavity 112 in the locking position, a defined spacing being produced between the active region of the active element 113 and the exit face 110. This spacing should be minimized, it being necessary to ensure that the active region and the exit face cannot touch one another under any circumstances.

It should be noted that the spacing is independent of the tolerances of the locking mechanisms. The spacing is defined only by the spacings between the edge of the lug 123 of the exit face 110, and the diameter of the hole 106. These dimensions are very small in terms of production engineering, so that the spacing hardly varies due to production. As a result, the spacing can be chosen to be as small as possible in order to avoid unnecessary attenuation.

Furthermore, the outwardly directed walls of the cavity have a perforation 117, which enables the connecting pins 109 of the active element 113 to be routed outwards. The lower region of the plug connector 101 has the printed circuit board 102, which has continuous openings 107a, 107b. The connecting pins 109 of the active element 113 and the connecting pins 124 of the screen 122 are led through the said openings. Furthermore, the latching feet 108 of the housing 103 are led through the opening 107b in order to fixedly connect the plug connector 101 to the printed circuit board 102.

These two plug connectors 1, 101 have made it possible for the externally accessible connections to continue to be arranged on the housing exterior of a multimedia device, and the first plug connector 1, in particular, is provided for this purpose. It has now become possible for an active element 113 which is sensitive to EM interference to be arranged in an EMC region with the aid of the second plug connector. The optical connection between active element 113 and the first plug connector is achieved by using a pigtail. As already mentioned, the latter is understood to mean an optical extension cable 40b, the latter having an OWG connector at both ends. These connectors are simply plugged into their corresponding chambers 9 and 104, respectively.

What is claimed is:

1. An OWG plug connector for a mechanically releasable connection between at least one OWG connector and a printed circuit board, the connector having a housing with at least one chamber for accommodating the OWG housing with at least one chamber for accommodating the OWG connector, the OWG connector being arranged to be seated in the chamber, and at least one cavity for accommodating an active element, the cavity and the chamber being connected via a hole;

a printed circuit board having openings for latching feet associated with the housing and for connecting pins;

the end piece of the at least one OWG connector being bound by an exit face; and at least one active element, wherein at least three shoulders are integrally formed on the inner walls of the cavity whereby the active region of the active element that is arranged in the cavity is oriented centrally with respect to the longitudinal axis of the hole and is arranged underneath the hole, the shoulder being formed by discrete contact areas between the active element and the housing, there being a minimum defined spacing produced between the exit face and the active region; and further wherein when the OWG connector is seated in the chamber, an end piece projects into the cavity, with the result that a minimum defined spacing is produced between the exit face and the active region.

2. OWG plug connector according to claim 1, wherein a lens is arranged on said active region of said active element, and further that connecting pins are routed out to the side of said active element.

3. OWG plug connector according to claim 1, wherein a side wall of said cavity has a perforation in order to route said connecting pins of said active element out of said cavity.

4. OWG plug connector according to claim 1, wherein said chamber has a square cross section, at least one wall of said chamber being designed as a securing arm.

5. OWG plug connector according to claim 4, wherein said securing arm has at least one latching lug at its free end on the side facing said chamber, which latching lug has a bevelled end and a rear side running transversely with respect to the plugging direction.

6. OWG plug connector according to claim 1, wherein a base region of said housing is provided with a screen, the latter having connecting pins adapted to be electrically connected to said printed circuit board.

7. OWG plug connector according to claim 1, further including an end piece that is cylindrical, at least one lug being integrally formed on the circumference of the said end piece in a manner spaced apart from said exit face.

8. OWG plug connector according to claim 1, wherein said active element is a transceiver.

9. OWG plug connector according to claim 1, wherein the plugging direction of the OWG connector is perpendicular to the plane of said printed circuit board.

10. OWG plug connector for a mechanically releasable connection between at least one OWG connector and a printed circuit board, having
- a housing having at least one chamber for accommodating the OWG connector and at least one cavity for accommodating an active element, the cavity and the chamber being connected via a hole;
- a printed circuit board having openings for latching feet of the housing and for connecting pins;
- at least one OWG connector, the end piece of the OWG connector being bounded by an exit face; and
- at least one active element, wherein at least three elastic shoulders are integrally formed on the inner walls of the cavity whereby the active region of the active element that is arranged in the cavity is oriented centrally with respect to the longitudinal axis of the hole and is arranged underneath the hole the shoulders being formed by discrete contact areas, at least one of these contact areas being longitudinally offset from the other contact areas.

11. OWG plug connector according to claim 10, wherein when the OWG connector is seated in said chamber, an end piece projects into said cavity with the result that a minimum defined spacing is produced between said exit face and said active region.

12. OWG plug connector according to claim 11, wherein a lens is arranged on said active region of said active element, and further that connecting pins are routed out to the side of said active element.

13. OWG plug connector according to claim 10, wherein a side wall of said cavity has a perforation in order to route said connecting pins of said active element out of said cavity.

14. OWG plug connector according to claim 10, wherein said chamber has a square cross section, at least one wall of said chamber being designed as a securing arm.

15. OWG plug connector according to claim 14, wherein said securing arm has at least one latching lug at its free end on the side facing said chamber, which latching lug has a bevelled end and a rear side running transversely with respect to the plugging direction.

16. OWG plug connector according to claim 10, wherein a base region of said housing is provided with a screen, the latter having connecting pins adapted to be electrically connected to said printed circuit board.

17. OWG plug connector according to claim 10, further including an end piece that is cylindrical, at least one lug being integrally formed on the circumference of the said end piece in a manner spaced apart from said exit face.

18. OWG plug connector according to claim 10, wherein said active element is a transceiver.

19. OWG plug connector according to claim 10, wherein the plugging direction of the OWG connector is perpendicular to the plane of said printed circuit board.

20. OWG plug connector for a mechanically releasable connection between at least one OWG connector and a printed circuit board, having
- a housing having at least one chamber for accommodating the OWG connector and at least one cavity for accommodating an active element, the cavity and the chamber being connected via a hole;
- a printed circuit board (102) having openings (107a, 107b) for latching feet (108) of the housing (103) and for connecting pins (109);
- at least one OWG connector, the end piece of the OWG connector being bounded by an exit face; and
- at least one active element, wherein at least three elastic shoulders are integrally formed on the inner walls of the cavity in such a way that the active region of the active element that is arranged in the cavity is oriented centrally with respect to the longitudinal axis of the hole and is arranged underneath the hole, and further wherein when the OWG connector is seated in the chamber, an end piece projects into the cavity, with the result that a minimum defined spacing is produced between the exit face and the active region.

21. OWG plug connector according to claim 20, wherein a lens is arranged on said active region of said active element, and further that connecting pins are routed out to the side of said active element.

22. OWG plug connector according to claim 20, wherein a side wall of said cavity has a perforation in order to route said connecting pins of said active element out of said cavity.

23. OWG plug connector according to claim 20, wherein said chamber has a square cross section, at least one wall of said chamber being designed as a securing arm.

24. OWG plug connector according to claim 23, wherein said securing arm has at least one latching lug at its free end on the side facing said chamber, which latching lug has a bevelled end and a rear side running transversely with respect to the plugging direction.

25. OWG plug connector according to claim 20, wherein a base region of said housing is provided with a screen, the latter having connecting pins adopted to be electrically connected to said printed circuit board.

26. OWG plug connector according to claim 20, further including an end piece that is cylindrical, at least one lug being integrally formed on the circumference of the said end piece in a manner spaced apart from said exit face.

27. OWG plug connector according to claim 20, wherein said active element is a transceiver.

28. OWG plug connector according to claim 20, wherein the plugging direction of the OWG connector is perpendicular to the plane of said printed circuit board.

* * * * *